United States Patent
Propst

[15] 3,707,175
[45] Dec. 26, 1972

[54] METHOD AND APPARATUS FOR HARVESTING TREES

[72] Inventor: Robert L. Propst, 2347 Londonderry Avenue, Ann Arbor, Mich. 48104

[22] Filed: July 20, 1970

[21] Appl. No.: 56,583

[52] U.S. Cl. ..........................144/309 AC, 144/3 D
[51] Int. Cl. ...............................................A01g 23/02
[58] Field of Search........144/2 Z, 3 D, 309 AC, 312, 144/2 R; 83/314, 315, 343, 345, 337

[56] References Cited

UNITED STATES PATENTS

| 936,572 | 10/1909 | Scott | 83/343 |
| 2,618,335 | 11/1952 | Price | 83/315 |
| 2,703,614 | 3/1955 | Bottenhorn | 83/337 |
| 3,140,736 | 7/1964 | Propst | 144/3 D |
| 3,160,339 | 12/1964 | Love | 83/337 |
| 3,455,193 | 7/1969 | Jackson et al. | 83/337 |
| 3,487,864 | 1/1970 | Larson et al. | 144/3 D |
| 3,516,462 | 6/1970 | Martinson et al. | 144/3 D |

*Primary Examiner*—Gerald A. Dost
*Attorney*—Olsen and Stephenson

[57] ABSTRACT

The method and apparatus for harvesting trees wherein a tree to be harvested is gripped, severed from its base, and then rotated about a substantially vertical axis spaced from the tree to a processing position. The vehicle on which the apparatus is mounted includes gripping and feeding rollers which feed the tree downwardly in the processing position of the tree while the vehicle is moving toward another tree to be harvested. During downward movement of the tree, it is cut into log lengths by cooperating rotatable blades and the log lengths are then moved to stored positions on the vehicle. By virtue of the location of the tree processing apparatus at a position spaced from the apparatus which initially grips and severs the tree, one tree can be processed while the vehicle is moving toward and severing another tree to be processed.

10 Claims, 11 Drawing Figures

PATENTED DEC 26 1972

INVENTOR
ROBERT L. PROPST

BY Olsen and Stephenson
ATTORNEYS

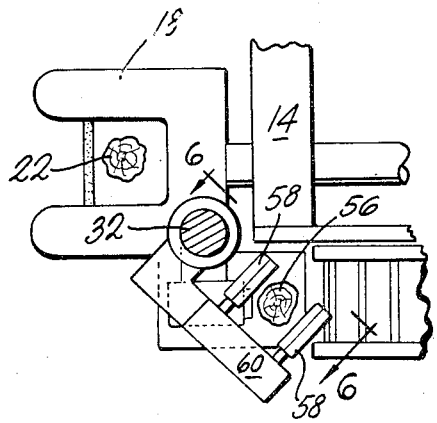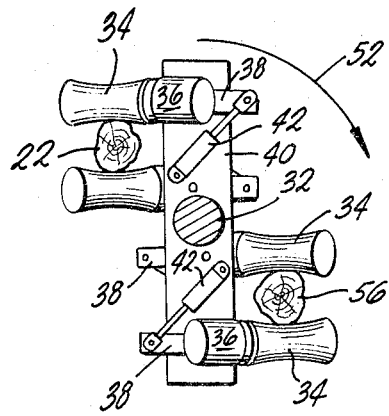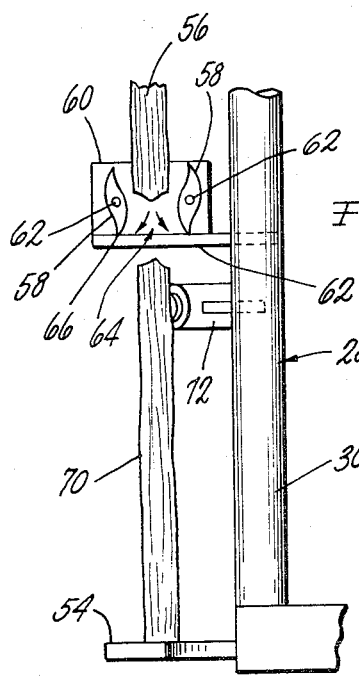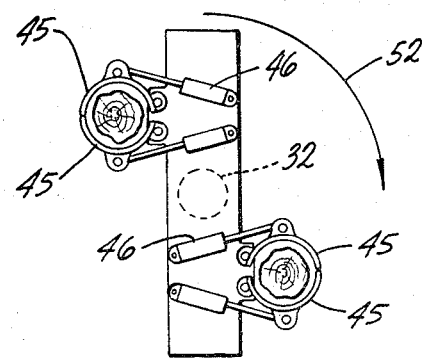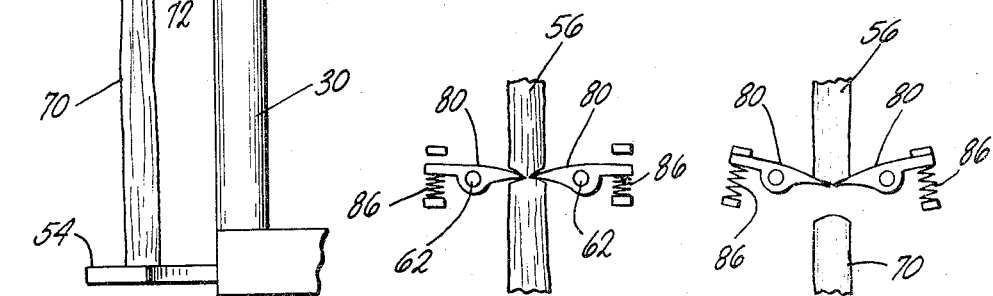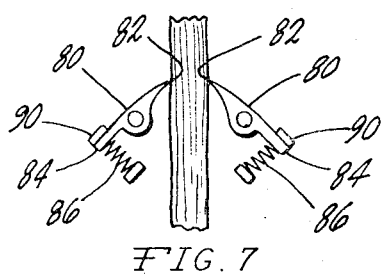

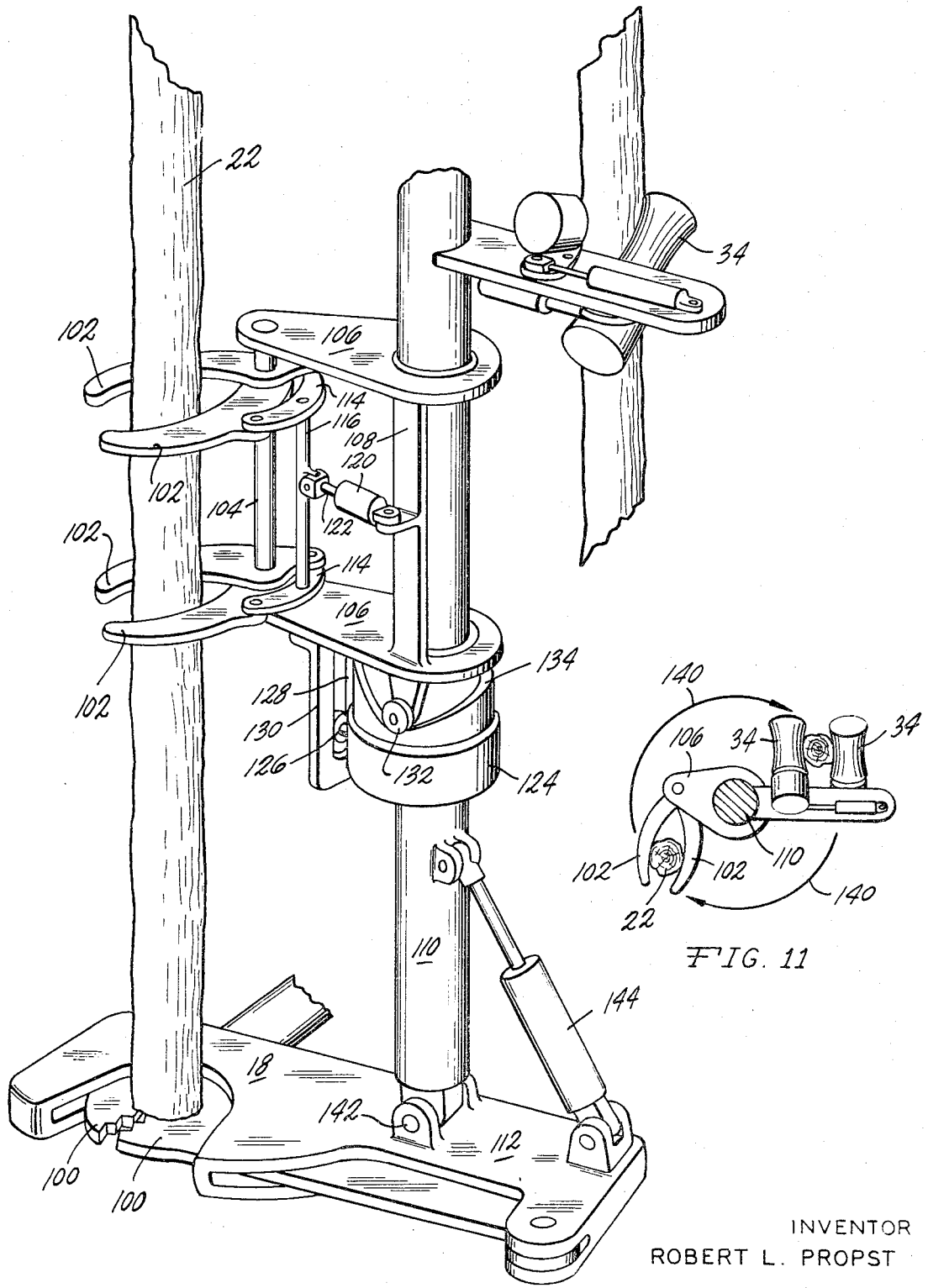

METHOD AND APPARATUS FOR HARVESTING TREES

CROSS REFERENCE TO RELATED APPLICATION

The timber harvesting apparatus of this invention is of the same general type as the apparatus disclosed in my prior copending application Ser. No. 029,109 filed Apr. 16, 1970.

BACKGROUND OF THE INVENTION.

Prior tree harvesting concepts have required the moving of harvesting apparatus to a position adjacent the tree to be harvested, and then stopping the apparatus while the tree felling and processing operation is being accomplished. The apparatus disclosed in my aforementioned copending application solves a large part of the time delay problems inherent in prior tree harvesting concepts because it enables continuous forward movement of the tree harvesting vehicle during harvesting operations. However, the speed of operation of the apparatus shown in the aforementioned copending application is limited by the fact that the first tree felled must be completely processed and converted into logs before the second tree can be felled since felling and processing operations are performed at the same location on the vehicle. The present invention is an improvement on the method and apparatus illustrated in the aforementioned patent application in that it provides separate tree felling and processing stations on the vehicle.

SUMMARY OF THE INVENTION

The present invention consists of a forwardly moving vehicle equipped on its forward end with tree gripping and severing apparatus which constitutes a tree felling station. The tree gripping means at the felling station is mounted on an upright rotatable mast structure which is operable to move the felled tree in a circular path to a substantially upright position at the processing station where the tree is converted into logs of predetermined length. At the processing station, tree gripping and feeding rollers operate to feed the severed tree downwardly. A delimbing mechanism removes the limbs from the tree and tree cutoff apparatus is disposed below the gripping and feeding rollers for cutting the tree into desired lengths. The cutoff mechanism consists of a pair of rotatable blades which rotate in opposite directions so that the cutting ends of the blades move downwardly in the direction of tree movement as they move through the tree so that they do not slow down the movement of the tree. In addition, springs associated with the cutoff blades enable the blades to self-adjust to a straight line cutoff entry into the tree. This adjustable movement allows the blades to be free from undue stresses caused by the rotary action of the blade drive actuators and allows the blades to wedge themselves into the tree and follow the path of least resistance. The cutoff tree sections are then moved onto a conveyor on the vehicle which moves the logs to stored positions on the vehicle. Thus, the method and apparatus of this invention enables fast and economical harvesting of trees primarily for the pulpwood industry since one tree can be processed at the processing station on the continuous moving vehicle while a second tree is being approached and felled.

Further objects, features and advantages of this invention will become apparent from a consideration of the following description, the appended claims, and the accompanying drawing in which:

FIG. 1 is a fragmentary side elevational view of the apparatus of this invention showing a felled tree in the processing station and a second tree being felled;

FIGS. 2, 3, 4 and 5 are transverse sectional views of the apparatus of this invention as seen from substantially the lines 2—2, 3—3, 4—4, and 5—5, respectively, in FIG. 1;

FIG. 6 is a sectional view of a portion of the apparatus of this invention illustrating the log cutoff mechanism, as seen from substantially the line 6—6 in FIG. 3;

FIGS. 7, 8 and 9 are diagrammatic views of a modified form of the log cutoff mechanism in the apparatus of this invention showing the mechanism in progressively moved positions to cut off a tree section;

FIG. 10 is a fragmentary perspective view of a modified form of a portion of the apparatus of this invention; and FIG. 11 is a horizontal sectional view of the modified form of the apparatus of this invention illustrated in FIG. 10.

Figure 1:
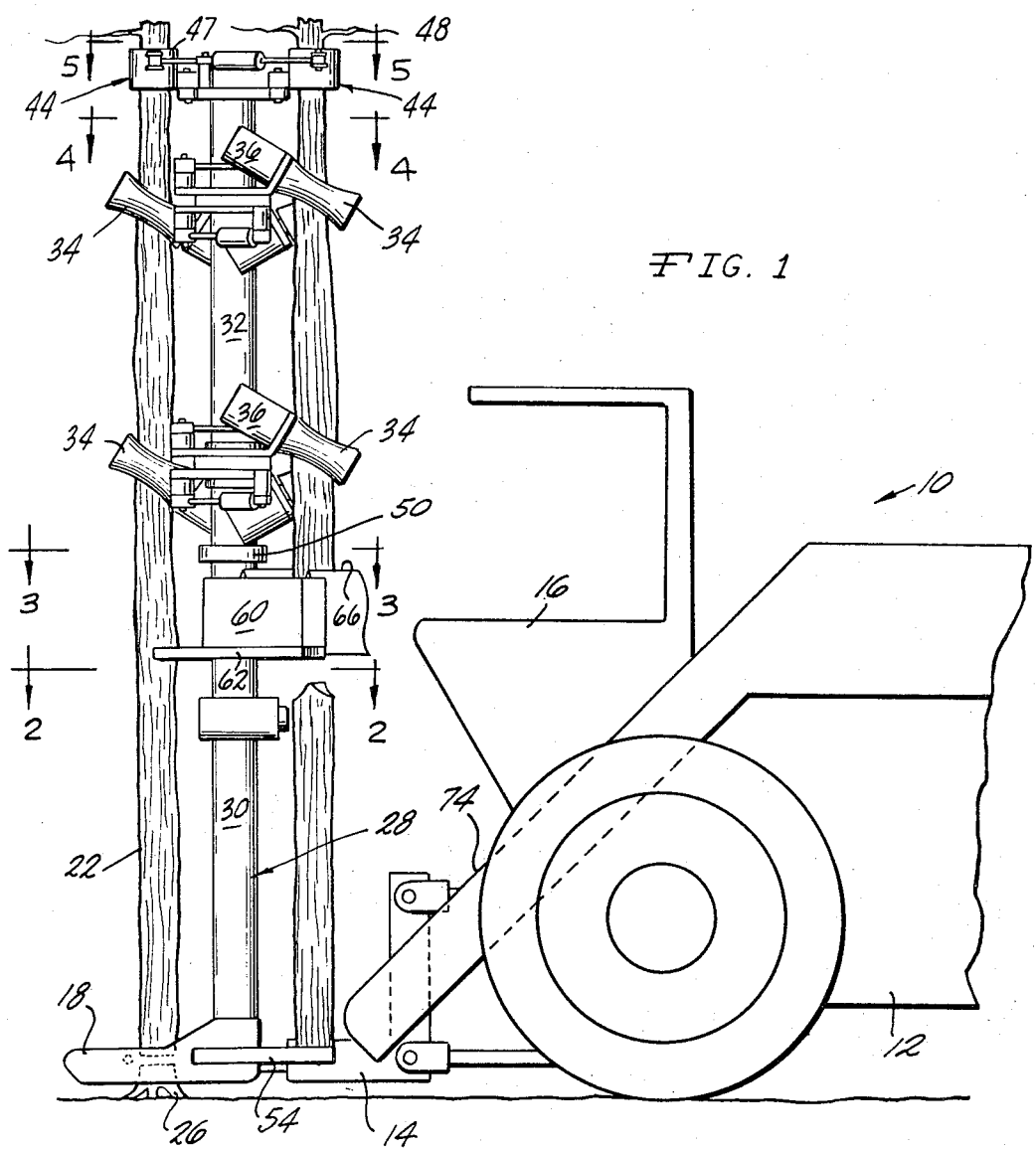

With reference to the drawing, the apparatus of this invention, indicated generally at 10, is illustrated in FIG. 1 as including a forwardly movable vehicle 12, only the front end portion of which is shown, having a frame 14 adjustably mounted on the front end thereof. The vehicle 12 also includes a cab 16 located at the front end of the vehicle at an elevated position from which the vehicle operator can steer the vehicle 12 and manipulate other components of the apparatus 10 with good visibility of tree felling and processing operations. A C-frame 18, mounted on the frame 14, has a pair of forwardly extending legs 20 spaced apart a distance sufficient to accommodate a tree 22 therebetween. A movable tree severing element 24, which can take a variety of forms, as explained in detail in the aforementioned copending application, is mounted on the C-frame 18 so that it extends between the legs 20 and is operable to sever the tree 22 from its base 26.

An upright mast assembly 28, having a lower section 30 mounted in a fixed position on the C-frame 18, has an upper rotatable section 32 which carries a plurality of tree gripping and feeding rollers 34 which are arranged in pairs and are likewise described in detail in the aforementioned copending application. Each roller 34 is driven by a hydraulic motor 36, and, as shown in FIG. 4, the rollers 34 are mounted on plates 38 which are in turn pivotally mounted on a frame 40 carried by the mast section 32. Cylinder assemblies 42 mounted on the frame 40 and connected to the plates 38 are operable to swing each pair of rollers 34 toward and away from each other to enable entry of a tree 22 between the rollers 34 when they are moved apart and to enable movement of the rollers 34 into gripping engagement with the tree 22 when the rollers are moved toward each other to their gripping positions illustrated in FIG. 4. Two pair of rollers 34 are provided at the felling station and two pair of rollers 34 are also provided at what will hereinafter be described as the tree processing station.

The mast section 32 also supports a pair of delimbing mechanisms 44 each of which consists of a pair of pivotally movable arcuate jaws 45 (FIG. 5) having sharp upper edges 47 and movable between open and closed positions by actuating cylinders 46. The mechanisms 44 are operable in their closed positions to remove limbs 48 from a tree being moved downwardly past the sharp jaw edges 47.

Figure 2:
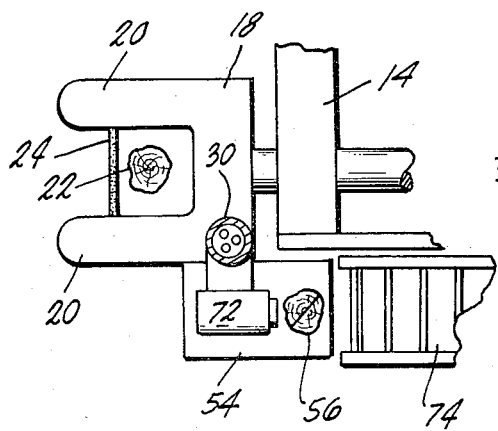

A rotary actuator 50, mounted on the fixed mast section 30, is operable to rotate the rotatable mast section 32 in the direction indicated by the arrows 52 in FIGS. 4 and 5 so as to move a felled tree 22 from the felling station defined by the C-frame 18 to a processing station which includes a lower stop plate 54 secured to the C-frame 18 (FIGS. 1 and 2) at a position to one side of the felling station. In FIG. 1, a tree 56 is illustrated at the processing station. The processing station also includes a pair of rotary blades 58 (FIG. 6) driven by a drive mechanism 60 mounted on a plate 62 secured to the mast section 30. The blades 58 are mounted for rotatable movement on shafts 62 in the directions indicated by the arrows 64 in FIG. 6. Since the blades 58 rotate in opposite directions, the cutting edges 66 of the blades 58 move in a downward direction, when they cut through a tree, for a purpose to appear presently. The blades 58 are operable to cut off a lower section of the tree 56 so as to form a log 70 of predetermined length. A hydraulically actuated kicker mechanism 72 is operable to buck the log 70 rearwardly into a position supported on a conveyor 74 carried by the vehicle 12 which transports the log 70 to a stored position on the vehicle 12.

In the operation of the apparatus 10, during movement of the vehicle 12 toward the tree 22, and during felling of the tree 22, the gripping and feeding rollers 34 at the processing station are operating to feed the tree 56 downwardly, since the tree 56 is then in a processing position. Concurrently with this downward movement of the tree 56, the cutoff blades 58 are being rotated to cut off lower sections of the tree 56 into logs 70 and the kicker mechanism 72 is operating to kick the logs onto the conveyor 74 after the logs hit the plate 54. The blades 58 are operated in timed relation with the feeding and gripping rollers 34 at the processing station so as to cut the logs 70 to predetermined lengths, and during downward movement of the tree 56 a delimbing mechanism 44 removes the limbs 48 from the tree 56. As soon as the tree 56 has been fully processed and converted into logs 70, the operator of the apparatus 10 actuates the rotary actuator 50 to rotate the mast section 32 so as to move the tree 22 from the felling station to the processing station. Concurrently, with actuation of the rotary actuator 50, the feeding and gripping rollers 34 which are in gripping engagement with the tree 22 are operated to lift the tree 22 so that it will clear the C-frame 18. As soon as the tree 22 has been moved to the processing station, the blades 58 are rotated to cut off a lower section of the tree 22 and this lower section is then moved onto the conveyor 74. The rollers 34 at the processing station then continuously feed the tree 22 downwardly concurrently with operation of the blades 58 to cut off lower sections of the tree 22 into logs 70. By virtue of the fact that the blades 58 have their cutting edges 66 moving into the tree 22 in the direction of movement of the tree 22, the blades 58 do not slow down the downward movement of the tree 22. As a result, the tree 22 can be rapidly converted into logs 70 while the vehicle 12 is being driven to the next tree to be processed and is operating to fell the next tree.

A modified and preferred form of the cutoff mechanism is illustrated in FIGS. 7, 8 and 9 for cutting trees into logs 70. The modified cutoff mechanism consists of a pair of blades 80 rotatably mounted like the blades 58 previously described but provided with cutting ends 82 and non-cutting ends 84. A spring 86 associated with each blade 80 extends between a stop 88 and the blade end 84 for urging the blade 80 in the direction of its rotation. The spring 86 normally urges the blade end 84 against a second stop 90, as shown in FIG. 7. However, as each blade 80 is forced into a tree, such as the tree 56 shown in FIG. 8, the spring 86 therefor allows the blade 80 to adjust its movement to a straight line cutoff entry into the tree 56, since the blade 80 can move against the pressure of the spring 86 as shown in FIG. 8. This spring movement of the blade 80 allows the blade to perform its cutting action free from undue stress caused by the rotary action of the blade drive actuator 60. Stated otherwise, the compression of the spring 86 for a blade 80 allows the blade 80 to wedge itself into the tree 56 following the path of least resistance as the blade 80 moves with the downwardly moving tree 56. As soon as the cutoff action is completed, the springs 86 return the blades 80 to their positions engaged with the stops 90, as shown in FIG. 9. In the modified cutoff mechanism, absent any cutting stress on the blade 80, the blade 80, the spring 86, and the stops 88 and 90 rotate as a whole around shaft 62. For each cut, the whole mechanism rotates a complete 360°, just as in the preferred form of blade 58. The blade 80, however, is free to rotate on shaft 62 relative to the stops 88 and 90 by compressing the spring, and therefore during cutting stress, the compression of the spring 86 for a blade 80 allows the blade to wedge itself into the tree 56 following the path of least resistance. FIGS. 7, 8 and 9 are diagrammatic in nature and therefore are not drawn to scale.

A modified form of the portion of the apparatus 10 which grips and severs the tree and moves the tree from the felling station to the processing station is illustrated in FIGS. 10 and 11. In the modified apparatus, the tree 22 is severed by movable jaws 100 mounted on the C-frame 18 and the tree 22 is gripped by pairs of clamping jaws 102 disposed at vertically spaced positions on the tree 22 above the C-frame 18. The jaws 102 are pivotally mounted on a shaft 104 supported at its upper and lower ends on plates 106 connected by a bar 108 and rotatably mounted on a non-rotatable mast 110 supported at its lower end on an extension 112 of the C-frame 18. ACtuating segments 114, which are connected by an upright rod 116, are pivotally connected to the clamping jaws 102. The piston rod 122 for a hydraulic cylinder assembly 120 mounted on the connecting bar 108 is pivotally attached to the connecting rod 116. As a result, on extension of the piston rod 122 for the cylinder assembly 120, the jaws 102 are moved apart to tree release positions and on retraction of the piston rod 122, the jaws 102 are moved to the tree clamping positions shown in FIG. 10.

A rotary actuator 124 on the mast 110 carries a roller 126 disposed in a slot 128 carried by a plate 130 which is secured to and depends from the lower plate 106. The lower plate 106 also carries a cam follower roller 132 which rides on a cam 134 secured to the mast 110. As a result, when the rotary actuator 124 is operated to move the roller 126 in a circular path about the mast 110, in the clockwise direction indicated by the arrows 140 in FIG. 11, the plates 106 are concurrently rotated about the mast 110 and moved upwardly along the cam 134 so as to both lift the tree 22 and rotate it from the felling station to the processing station where it is released by the clamps 102 and gripped by pairs of feeding and gripping rollers 34, only one of which is shown, mounted on the mast 110.

In the illustrated embodiment of the mast 110 shown in FIG. 10, it is pivotally mounted at its lower end on a shaft 142 and a cylinder assembly 144 is provided for adjusting the vertical position of the mast 110 to adapt the apparatus for processing trees 22 which are not exactly vertical. Thus, in the modified apparatus shown in FIGS. 10 and 11, the feeding and gripping rollers 34 are required only at the processing station and the required lifting of the tree 22 is accomplished automatically during rotatable movement of a felled tree from the felling station to the processing station. The cylinder assembly 120 is operated in a timed relation with the rotary actuator 124 so as to open the jaws 102 when the tree has been gripped by the rollers 34 and to close the jaws 102 when they have been returned to the felling station and it is desired to grip a tree being felled, such as the tree 22 shown in FIG. 10.

From the above description it is seen that this invention provides apparatus 10 which is capable of rapidly converting trees into logs 70 by virtue of the provision of separate tree felling and tree processing stations. While the apparatus 10 is being moved from one tree to be felled to the next, trees are constantly being processed at the processing station. The rotary cutoff blades provide for a rapid cut off of the trees during downward movement at the processing station since the rotary blades move in the direction of the downwardly moving tree being processed.

What is claimed is:

1. The method of harvesting trees utilizing a moving vehicle comprising the steps of:
   a. gripping a tree to be harvested;
   b. severing said tree from its base;
   c. maintaining said tree upright and rotating said gripped upright tree about a substantially vertical axis which is spaced from said tree a substantially uniform distance to a processing position; and
   d. separating said tree into logs of predetermined length while said tree is in said processing position concurrently with moving said vehicle toward another tree to be harvested.

2. The method according to claim 1 further including the step of lifting said tree following gripping thereof and prior to location of said tree in said processing position and maintaining said tree upright in said processing position.

3. Apparatus for harvesting trees comprising a forwardly movable vehicle, means on the forward end of said vehicle operable to sever a tree from its base, means for gripping said severed tree and maintaining said tree in an upright position, means for rotating said gripped and severed tree about a substantially vertical axis substantially uniformly spaced from said tree to a processing position spaced from said severing means, and means on said vehicle operable in said processing position of said tree to feed said tree downwardly concurrently with severing lower portions of said tree into log lengths.

4. Apparatus according to claim 3 further including means for lifting said tree upwardly between severing and positioning of said tree in said processing position.

5. Apparatus according to claim 3 further including an upright mast on the forward end of said vehicle, means rotatably mounting said tree gripping means on said mast, means operable to rotate said tree gripping means about said mast, and cam and cam follower means operatively associated with said rotating means to provide for upward movement of said gripping means during rotation thereof.

6. Apparatus according to claim 5 wherein said gripping means comprises vertically spaced releasable clamp units and further including tree gripping and feeding rollers located so as to grip said tree in said processing position thereof and being operable to feed said tree downwardly.

7. Apparatus for processing trees comprising means for continuously feeding a tree in one direction, tree cutoff means comprising a pair of rotary blades pivotally mounted on opposite sides of said tree and having cutting ends engageable with said tree, said blades being rotatable in opposite directions with respect to each other so that said cutting ends move in a path which is in the same general direction as said tree movement during movement of said cutting ends through said tree, said blades being positioned so that on concurrent rotation thereof said cutting ends will be moved to closely spaced adjacent positions so as to cut through said tree, and spring means associated with each of said blades so as to resiliently urge said blade in said direction of rotation to thereby enable each blade to move back against the pressure of the spring therefor so as to adjust the blade movement into a tree so that the blade can perform a substantially straight line cutoff action.

8. Apparatus according to claim 4 wherein said means for gripping said severed tree comprises as least one drive roller having an external surface disposed in gripping engagement with said tree and wherein said means for lifting said tree includes a drive motor for said roller operable to rotate said roller in a direction to lift said tree.

9. Apparatus according to claim 8 further including tree cutoff means disposed below said drive roller and operable in said processing position of said tree to cut said tree into log lengths.

10. Apparatus according to claim 9 wherein said means for feeding said tree downwardly in said processing position comprises said drive roller and said drive motor and wherein said cutoff means comprises a pair of rotary blades pivotally mounted on opposite sides of said tree, said blades having cutting ends and being rotatable in opposite directions with respect to each other so that said cutting ends will be moved radially inwardly and downwardly into said downwardly moving tree, said cutting ends being movable into adjacent positions to cut off said tree.

* * * * *